(12) United States Patent
Yamada et al.

(10) Patent No.: US 12,003,357 B2
(45) Date of Patent: Jun. 4, 2024

(54) RECEIVER

(71) Applicant: ALPS ALPINE CO., LTD., Tokyo (JP)

(72) Inventors: Yukimitsu Yamada, Miyagi (JP);
Daisuke Takai, Miyagi (JP);
Mitsunobu Inoue, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 197 days.

(21) Appl. No.: 17/816,480

(22) Filed: Aug. 1, 2022

(65) Prior Publication Data
US 2022/0368580 A1    Nov. 17, 2022

Related U.S. Application Data

(63) Continuation of application No. PCT/JP2021/001667, filed on Jan. 19, 2021.

(30) Foreign Application Priority Data

Feb. 13, 2020   (JP) .................. 2020-022101

(51) Int. Cl.
*H04L 27/26*    (2006.01)
*H04L 27/36*    (2006.01)
*H04L 5/00*     (2006.01)

(52) U.S. Cl.
CPC ...... *H04L 27/26025* (2021.01); *H04L 27/364* (2013.01); *H04L 5/0048* (2013.01)

(58) Field of Classification Search
CPC ... H04L 27/364; H04L 27/363; H04L 27/362; H04L 27/26025; H04L 27/2603; H04L 27/18

See application file for complete search history.

(56) References Cited

U.S. PATENT DOCUMENTS 5,131,014 A    7/1992  White
5,905,763 A    5/1999  Kamikubo
(Continued)

FOREIGN PATENT DOCUMENTS

JP    H10-145184    5/1998
JP    H10-145439    5/1998
(Continued)

OTHER PUBLICATIONS

International Search Report for PCT/JP2021/001667 mailed on Mar. 16, 2021.

*Primary Examiner* — Khanh C Tran
(74) *Attorney, Agent, or Firm* — IPUSA, PLLC

(57) ABSTRACT

In order to provide a receiver capable of accurately determining a phase difference of I/Q signals, a receiver includes a section detector configured to detect a section between a rising and a falling of a phase based on the rising and the falling of the phase represented by I/Q signals generated based on an advertisement packet transmitted from a transmitter, and a section setting unit configured to identify, within the section between the rising and the falling of the phase, a period in which a first variation amount of the phase is equal to or less than a first predetermined amount, and use the identified period as a section for detecting the phase of the I/Q signals. The section detector detects the rising when a first phase is smaller than a last phase among a plurality of phases acquired by sampling the phases.

19 Claims, 12 Drawing Sheets

(56) References Cited

U.S. PATENT DOCUMENTS

| | | | | |
|---|---|---|---|---|
| 2004/0078737 | A1* | 4/2004 | Miyamoto | H04L 7/043 |
| | | | | 714/700 |
| 2019/0075518 | A1* | 3/2019 | Ganton | H04W 4/029 |
| 2021/0088622 | A1* | 3/2021 | Nishimoto | G01S 5/0218 |
| 2023/0189242 | A1* | 6/2023 | Aronkytö | H04W 72/1273 |
| | | | | 370/311 |

FOREIGN PATENT DOCUMENTS

| | | |
|---|---|---|
| JP | 2006-177722 | 7/2006 |
| WO | 2018/123957 | 7/2018 |
| WO | 2020/013275 | 1/2020 |

* cited by examiner

RECEIVER

CROSS-REFERENCE TO RELATED APPLICATIONS

This application is a continuation application of International Application No. PCT/JP2021/001667 filed on Jan. 19, 2021, and designating the U.S., which is based upon and claims priority to Japanese Patent Application No. 2020-022101, filed on Feb. 13, 2020, the entire contents of which are incorporated herein by reference.

BACKGROUND

1. Technical Field

The present disclosure relates to a receiver.

2. Description of the Related Art

Conventionally, there is a waveform equalization circuit that reduces waveform distortion of an input signal. The waveform equalization circuit includes a waveform equalization unit that inputs the input signal and makes the frequency characteristics variable, and a control signal generation unit that calculates the input signal and generates a control signal according to the inclination of the input signal in accordance with the timing at which the waveform equalization unit processes the input signal. The waveform equalization circuit is characterized by comprising a control means for varying the frequency characteristic of the waveform equalization unit based on the control signal (see, for example, Patent Document 1).

RELATED-ART DOCUMENTS

Patent Documents

Patent Document 1: Japanese Patent Application Laid-Open No. 1998-145184

SUMMARY

In a receiver for obtaining a phase difference of I/Q signals from the received signal, the phase difference cannot be accurately determined unless the time when the receiver captures the received signal is synchronized with the time when the controller of the receiver processes the received signal.

Accordingly, the purpose of the present invention is to provide a receiver capable of accurately determining the phase difference of the I/Q signals.

A receiver includes a section detector configured to detect a section between a rising and a falling of a phase based on the rising and the falling of the phase represented by I/Q signals generated based on an advertisement packet transmitted from a transmitter, and a section setting unit configured to identify, within the section between the rising and the falling of the phase, a period in which a first variation amount of the phase is equal to or less than a first predetermined amount, and use the identified period as a section for detecting the phase of the I/Q signals. The section detector detects the rising when a first phase is smaller than a last phase among a plurality of phases acquired by sampling the phases.

DETAILED DESCRIPTION

Hereinafter, embodiments in which a receiver according to the present invention is applied will be described.

Embodiment 1

Figure 1:
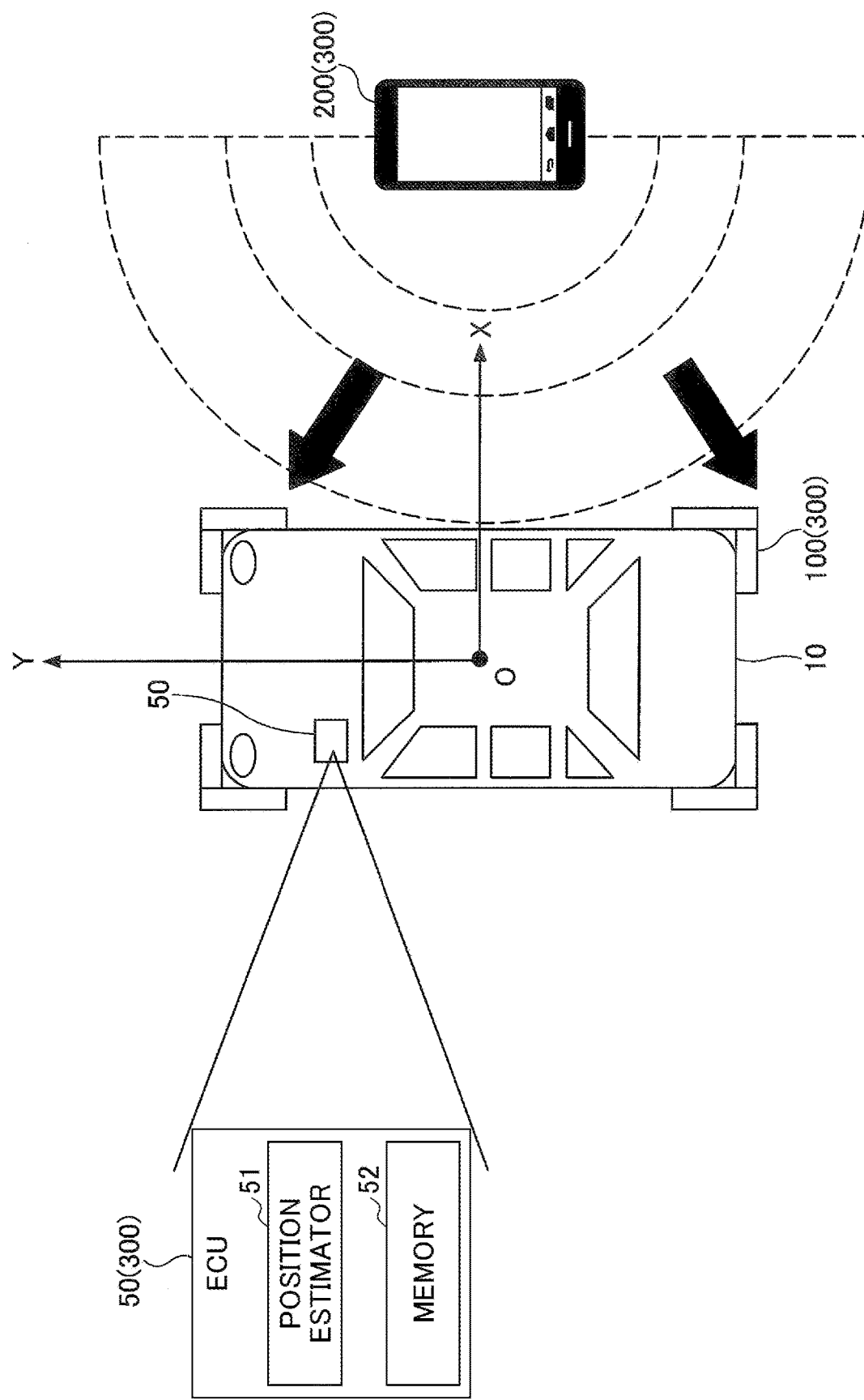
FIG. 1 is a diagram illustrating a position estimation system 300 according to Embodiment 1.

FIG. 1 is a diagram illustrating a position estimation system 300 according to Embodiment 1. The position estimation system 300 includes an electronic control unit (ECU) 50 and a receiver 100 mounted on a vehicle 10 and a smartphone 200. Therefore, the ECU 50, the receiver 100, and the smartphone 200 are bracketed with the reference numeral 300 which is the reference numeral of the position estimation system 300.

The position estimation system 300 is used in an automatic parking system in which the vehicle 10 parks independently in a parking position by remotely transmitting a command over radio communication. The functions required for such an automatic parking system are embedded in the ECU 50, the receiver 100, and the smartphone 200 by way of example, but will not be described in detail herein.

The vehicle 10 includes multiple ECUs, but in FIG. 1, an ECU 50 associated with the position estimation system 300 is illustrated. The ECU 50 includes a position estimator 51 for estimating a position of the vehicle 10 and a memory 52. The ECU 50 is implemented by a computer including a Central Processing Unit (CPU), a Random Access Memory (RAM), a Read Only Memory (ROM), and an internal bus. The position estimator 51 illustrates a function performed by the ECU 50 as a function block. The memory 52 functionally represents the memory of the ECU 50.

Multiple receivers 100 are provided in the vehicle 10. Each receiver 100 includes multiple antennas. As an example, eight receivers 100 are provided in corners of the vehicle 10. The receiver 100 receives advertisement packets of Bluetooth Low Energy (BLE) (registered trademark) transmitted by the smartphone 200.

The smartphone 200 is an example of a transmitter that transmits the BLE advertisement packet and is an example of an operating unit that can move and operate the vehicle 10 from outside the vehicle 10 via radio communication. The wireless communication between the receiver 100 and the smartphone 200 is not limited to the BLE, but may include communication of a Wireless Local Area Network (WLAN) or other standards.

In the position estimation system 300 as described above, the position estimator 51 performs a position estimation of the smartphone 200, as an example, in an Angle-of-Arrival (AOA) format to estimate a position where the smartphone 200 is present around the vehicle 10.

In the AOA format, the position estimator 51 estimates the position of the smartphone 200 using, as an example, two Angle-of-Arrivals of the advertisement packet determined respectively by the two receivers 100 and the positional relationship between the two receivers 100 (distance between the two receivers 100).

Further, when the position estimator 51 receives the advertisement packet from a single receiver 100 as an example, the position estimator 51 determines an approximate position of the vehicle 10 based on the angle with respect to the single receiver 100 and a Received Signal Strength Indicator (RSSI) value of the advertisement packet. This is because the RSSI value gives an approximate distance from the receiver 100 to the smartphone 200.

Figure 2:
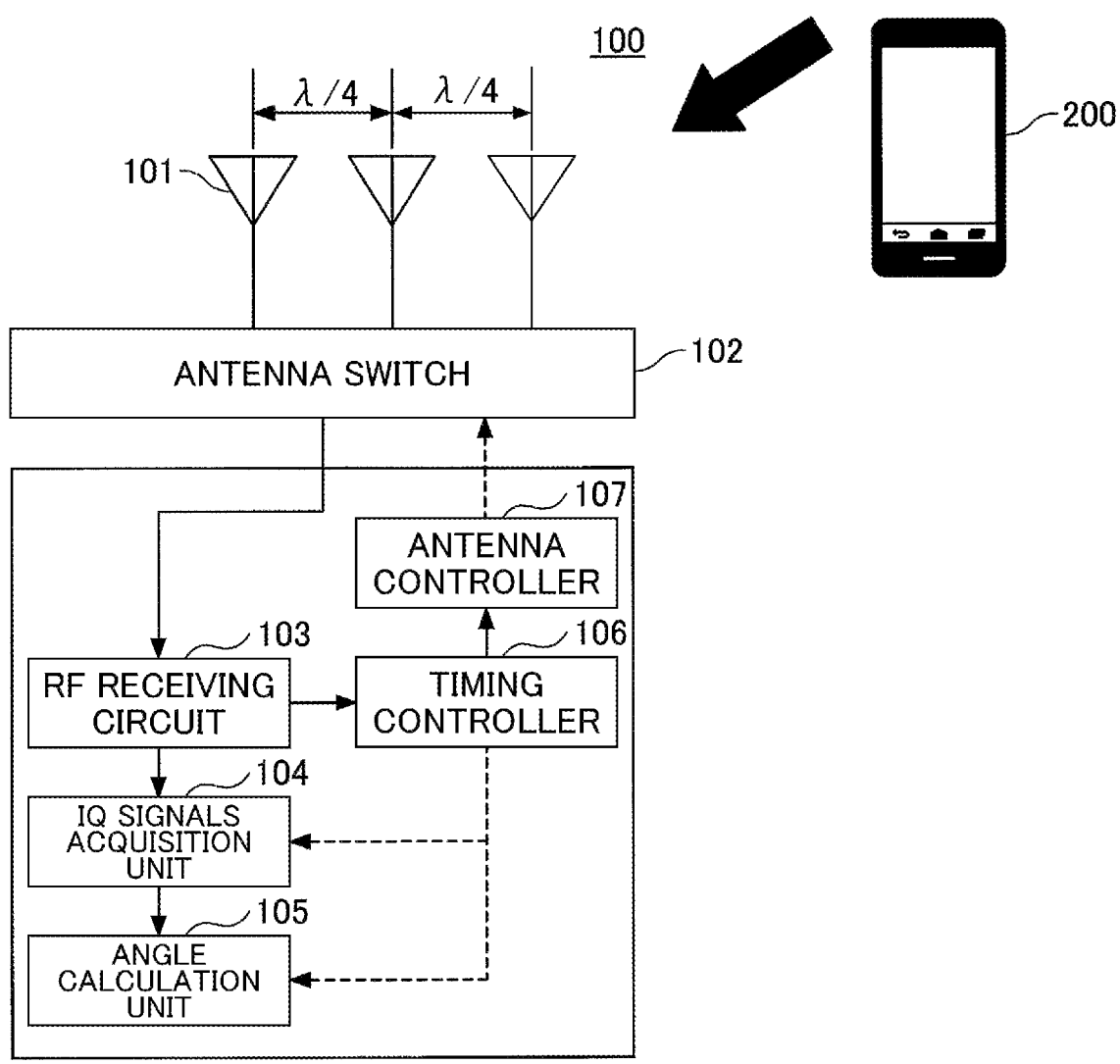
FIG. 2 is a diagram illustrating a receiver 100 and a smartphone 200.

FIG. 2 is a diagram illustrating the receiver 100 and the smartphone 200. Here, a process of receiving the advertisement packet and calculating the Angle-of-Arrival of the receiver 100 will be briefly described with reference to FIG. 2, and the related configuration will be briefly described.

The receiver 100 includes three antennas 101, an antenna switch 102, a Radio Frequency (RF) receiving circuit 103, an IQ signal acquisition unit 104, an angle calculation unit 105, a timing controller 106, and an antenna controller 107. Here, it should be noted that although the receiver 100 includes three antennas 101, the receiver 100 may include a plurality of antennas 101, and the number of antennas 101 may be two or more.

The three antennas 101 are spaced apart by a quarter wavelength ($\lambda/4$) of the wavelength ($\lambda$) in the communication frequency and are connected to the RF receiving circuit 103 via the antenna switch 102. On the output side of the RF receiving circuit 103, the IQ signal acquisition unit 104 and the angle calculation unit 105 are connected in this order, and the timing controller 106 is connected.

The timing controller 106 outputs a signal indicating a predetermined timing to the IQ signal acquisition unit 104, the angle calculation unit 105, and the antenna controller 107 based on the timing when the advertisement packet is input to the RF reception circuit 103.

In a state of waiting for reception, the receiver 100 waits until the antenna controller 107 detects a specific signal (for example, a signal indicating an advertisement address of the advertisement packet and indicating that an authentication identifier (ID) contained within the payload matches an ID of the vehicle 10 side) in the RF receiving circuit 103 while the antenna controller 107 causes the antenna switch 102 to select one specific antenna 101.

When the reception is detected by the RF receiving circuit 103, the timing controller 106 starts operation, the IQ signal acquisition unit 104 acquires the IQ signal, and the antenna controller 107 switches causes the antenna switch 102 to perform switching according to the timing.

When the angle calculation unit 105 detects a completion of reception of a single advertisement packet based on the signal indicating the timing output by the antenna controller 107, the angle calculation unit 105 calculates the angle at which the advertisement packet arrived by using the IQ signal acquired by the IQ signal acquisition unit 104.

As described above, the receiver 100 calculates the Angle-of-Arrival based on the advertisement packet.

Figure 3:
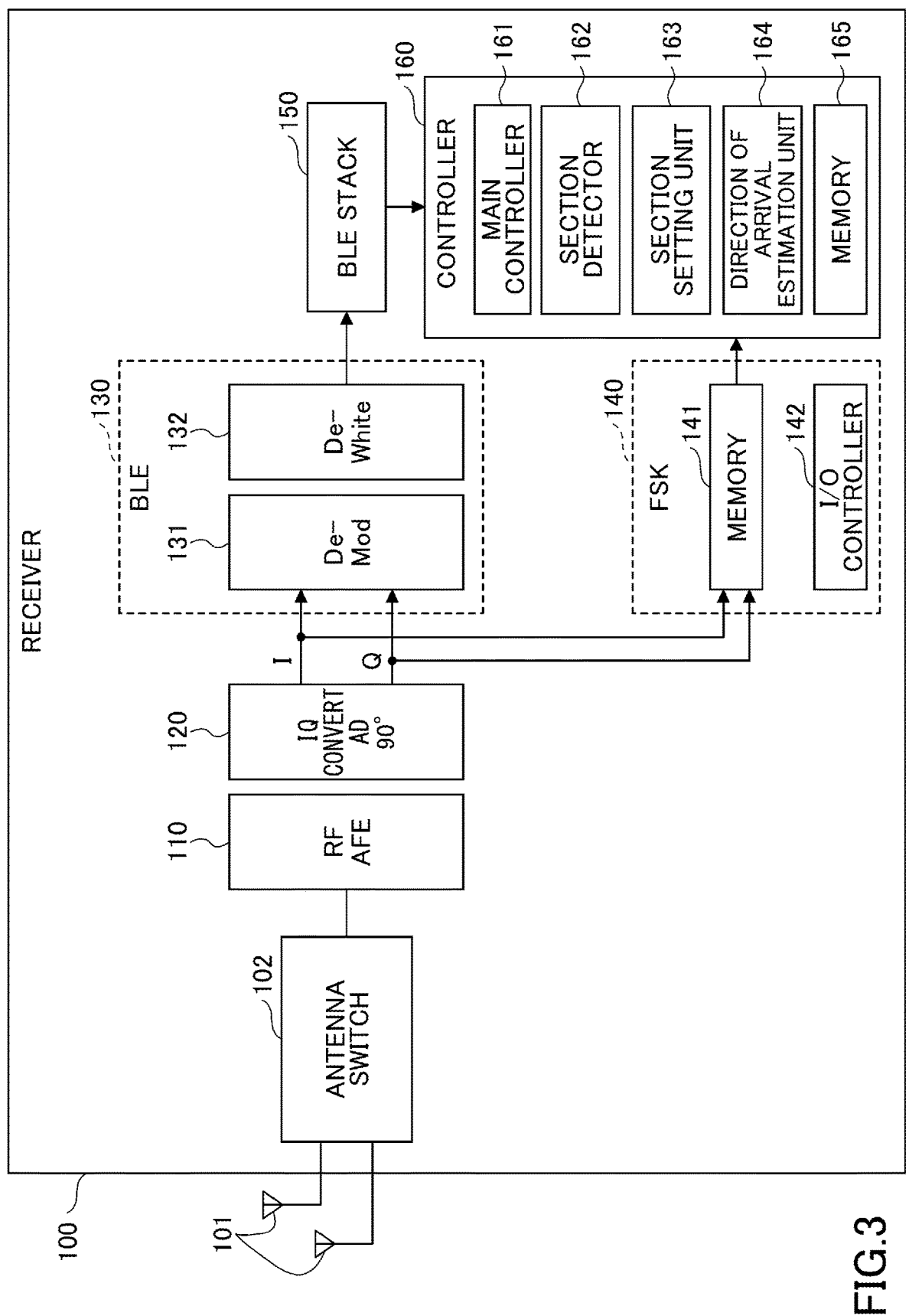
FIG. 3 is a diagram illustrating the receiver 100.

FIG. 3 is a diagram illustrating the receiver 100. The receiver 100 includes a Radio Frequency Analog Front End (RFAFE) 110, an Analog to Digital (AD) converter 120, a BLE circuit 130, an FSK processing unit 140, a BLE stack 150, and a controller 160.

The RFAFE 110 is an analog front end and is a circuit corresponding to the RF receiving circuit 103 illustrated in FIG. 2. The RFAFE 110 receives BLE advertisement packets by switching a channel 37, a channel 38, and a channel 39 of the BLE in chronological order. The RFAFE 110 receives the advertisement packet sequentially on three receive channels while switching the receive channels in the order of the channel 37, the channel 38, and the channel 39 at a predetermined time.

The AD converter 120 is connected to the output side of the RFAFE 110 and includes a mixer that multiplies the advertisement packet output from the RFAFE 110 by a carrier wave of which the phase differs by 90 degrees and a digital low pass filter provided on the output side of the mixer. The AD converter 120 converts a signal into the I/Q signals, and digitally converts the signal to output. The AD converter 120 corresponds to the IQ signal acquisition unit 104 illustrated in FIG. 2.

The BLE circuit 130 is provided on the output side of the AD converter 120 and includes a demodulator (De-Mod) 131 that demodulates the I/Q signals output from the AD converter 120 to obtain data and a dewhitening unit (De-White) 132 that performs dewhitening (de-whites) the demodulated data.

It should be noted that the BLE circuit 130 performs demodulation and de-whitening of the I/Q signals not for the advertisement packet but for a packet such as a message.

The FSK processing unit 140 is provided on the output side of the AD converter 120 in parallel with the BLE circuit 130 and includes a memory 141 for directly inputting the I/Q signals output from the AD converter 120 into the controller 160 and an I/O controller 142 for controlling an input and an output of the I/Q signals in the memory 141.

The BLE stack 150 is provided on the output side of the dewhitening unit 132 of the BLE circuit 130. The BLE stack 150 retains the I/Q signals of the packet such as a demodulated and dewhitened message, and inputs the I/Q signals to the controller 160.

The controller 160 includes a main controller 161, a section detector 162, a section setting unit 163, a Direction-of-Arrival estimation unit 164, and a memory 165. The controller 160 is implemented by, for example, a microcomputer including a CPU, a RAM, a ROM, an internal bus, and the like.

The main controller 161, the section detector 162, the section setting unit 163, and the Direction-of-Arrival estimation unit 164 illustrate a function performed by the controller 160 as a function block. The memory 165 is a functional representation of the memory of the controller 160.

Here, a process performed by the controller 160 based on the I/Q signals generated from the advertisement packet will be described, and a process performed for the I/Q signals of the packet, such as a message, will be omitted.

The main controller 161 is a processing unit that supervises control processing of the controller 160 and performs processing other than processing performed by the section detector 162, the section setting unit 163, and the Direction-of-Arrival estimation unit 164. The main controller 161 also includes functions of the timing controller 106 and the antenna controller 107 illustrated in FIG. 2. Further, the main controller 161 converts the I/Q signals taken into the memory 141 to arctan and outputs a phase (angle). The section detector 162 detects the section between the rising and falling of the I/Q signals based on the rising or falling of the I/Q signals generated based on the advertisement packet transmitted from the smartphone 200. Details of the processing performed by the section detector 162 will be described later with reference to FIG. 7.

The section setting unit 163 extracts a section in which a variance value of a phase amplitude of the I/Q signals at a sampling point included in the section is equal to or less than a predetermined value from among the sections between the rising and falling of the phase of the I/Q signals and sets the section to a section for detecting the phase of the I/Q signals. Here, the variance value of the phase amplitude of the I/Q signals is an example of a first variation amount of the phase, and a predetermined value is an example of a first predetermined amount.

The Direction-of-Arrival estimation unit 164 estimates an angle (the Angle-of-Arrival) at which the advertisement packet arrived to the receiver 100 based on the phase difference of the three I/Q signals generated from the advertisement packet received by the three antennas 101 of the receiver 100 (refer to FIG. 2), and stores the data representing the estimated Angle-of-Arrival in the memory 165. The Direction-of-Arrival estimation unit 164 calculates the phase difference of the I/Q signals to estimate the Angle-of-Arrival of the advertisement packet. The Direction-of-Arrival estimation unit 164 corresponds to the angle calculation unit 105 illustrated in FIG. 2.

The memory 165 stores a program or data necessary for the controller 160 to perform the control processing. For example, data representing the Angle-of-Arrival estimated by the Direction-of-Arrival estimation unit 164 is stored. The data representing the Angle-of-Arrival is transmitted to the position estimator 51 of the ECU 50 via a network such as a Controller Area Network (CAN) of the vehicle 10.

As a result, the position estimator 51 estimates the position of the smartphone 200 according to the position estimation method of Embodiment 1.

Here, the receiver 100 and the smartphone 200 are included in a communication system and a Direction-of-Arrival estimation system according to Embodiment 1. The Direction-of-Arrival estimation system includes multiple antennas 101 of the receiver 100 (see FIG. 2), the section detector 162, the section setting unit 163, and the Direction-of-Arrival estimation unit 164.

Figure 4:
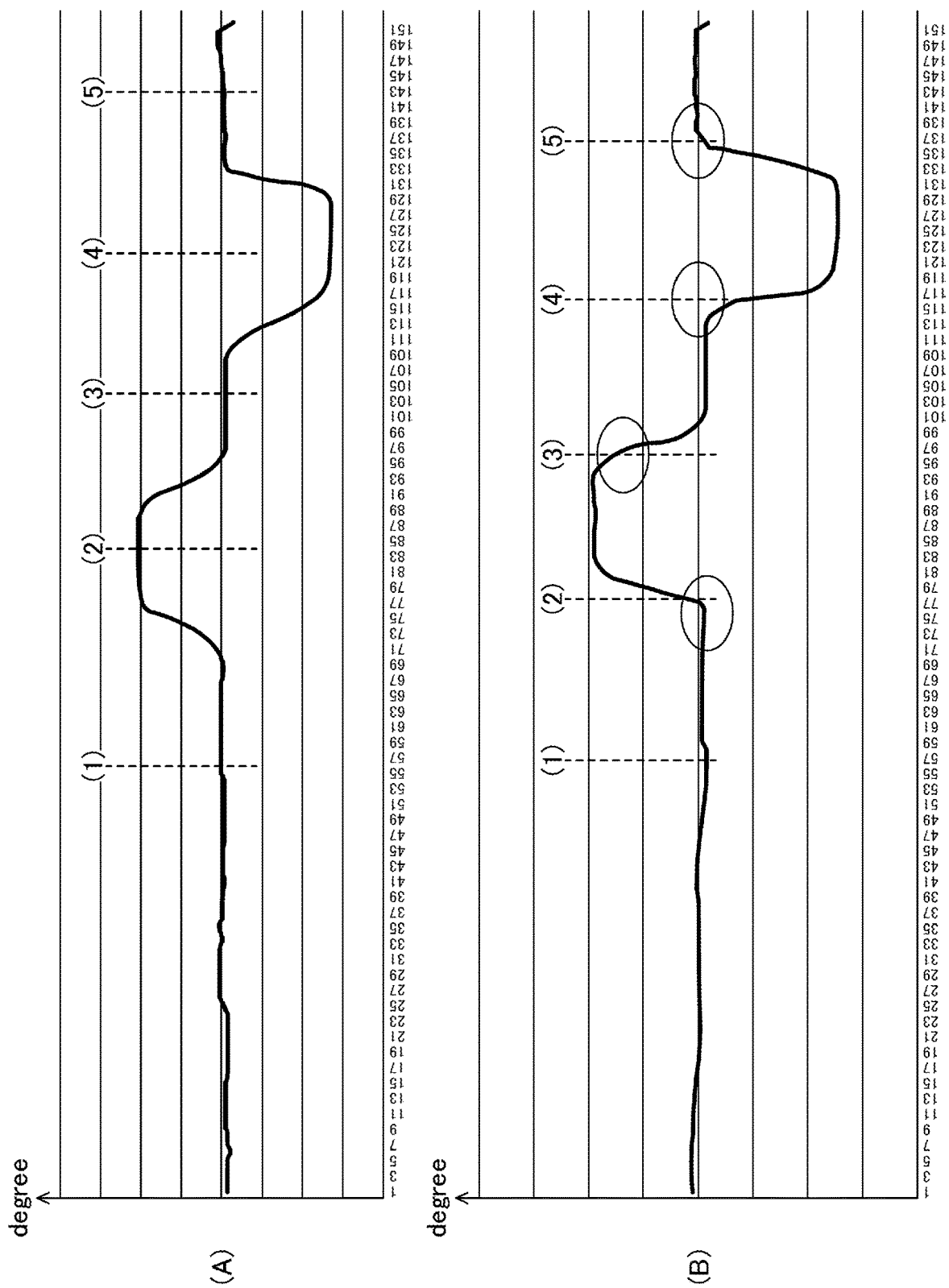
FIG. 4 is a diagram illustrating examples of a waveform of an I signal.

FIG. 4 is a diagram illustrating an example of a waveform of the phase of the IQ signal. In (A) and (B) of FIG. 4, the horizontal axis represents time and the vertical axis represents a degree of the IQ signal.

The phase of the IQ signal is filtered and thus has a blunt rectangular wave-like waveform. In order to estimate the position of the smartphone 200 in the AOA format, it is desirable to accurately determine the phase difference between a position where the phase is zero (the position at the center of the amplitude) and a position where the phase changes and is stable (the median value in the time zone where the phase is changing as a guide).

Times (1) to (5) represent the timing of switching the three antennas 101. For example, the times (1) to (2) represent a phase obtained from the I/Q signals received by a first antenna 101. Further, the times (2) to (3) represent a phase obtained from the I/Q signals received by a second antenna 101. The times (3) to (4) represent a phase obtained from the I/Q signals received by the first antenna 101. The times (4) to (5) represent a phase obtained from the I/Q signals received by a third antenna 101.

For example, when the phase of the IQ signal is measured five times at times (1) to (5), in (A) of FIG. 4, the phase of the IQ signal at times (1), (3), and (5) is substantially zero, and the phase of the IQ signal at times (2) and (4) is substantially maximum. Therefore, in times (1) to (5) illustrated in (A) of FIG. 4, the phase difference between the position where the phase is zero (the position at the center of the amplitude) and the position where the phase changes and is stable (the median value in the time zone where the phase is changing as a guide) can be accurately determined.

On the other hand, in (B) of FIG. 4, the phase of the IQ signal at the time (1) is substantially zero, but the phase at the time (3) and (5) is approaching the rising and falling sections, and the phase at the time (2) and (4) is not substantially zero, and the phase at the time (2) and (4) is approaching the rising and falling sections, so that the phase is not substantially the maximum value. Therefore, in the time (1) to (5) illustrated in (B) of FIG. 4, the phase difference between the position where the phase is zero (the position at the center of the amplitude) and the position where the phase changes and is stable (the median value in the time zone where the phase is changing as a guide) cannot be accurately determined.

In the receiver 100, since the memory 141 does not synchronize the timing of acquiring the I/Q signals with the timing of detecting the phase of the IQ signal input from the memory 141 by the controller 160, the phase difference of the IQ signal may not be accurately determined, as illustrated in (B) of FIG. 4.

Further, it is necessary to switch three antennas 101 with the antenna switch 102 to acquire the phase difference of the I/Q signals based on the advertisement packet received by both antennas 101.

Hereinafter, a method of measuring the phase of the I/Q signals with timing that enables an accurate determination of the phase difference of the IQ signal in the receiver 100 as illustrated in (A) of FIG. 4 will be described.

Figure 5:
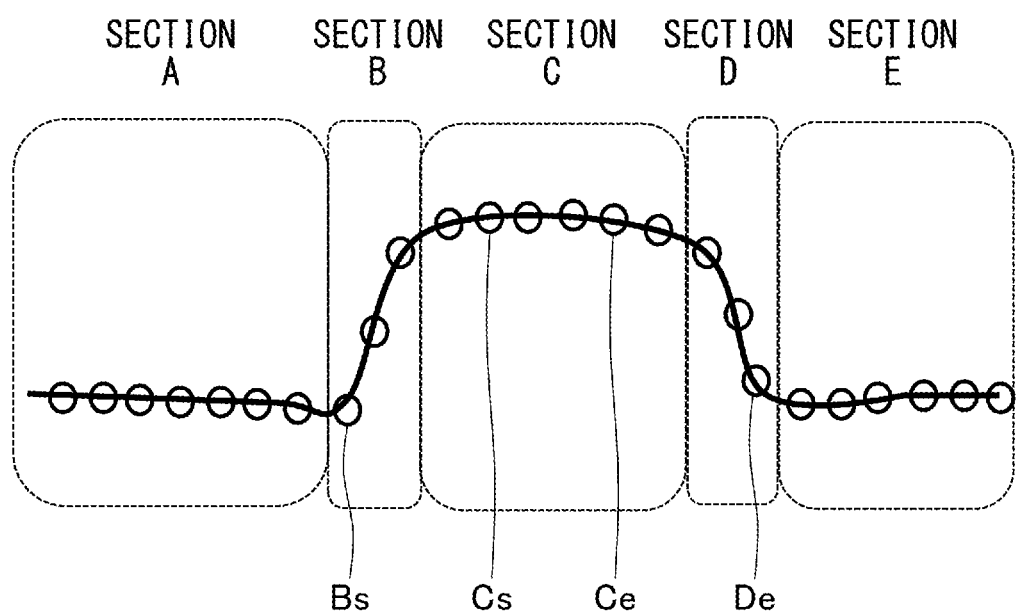
FIG. 5 is a diagram illustrating a waveform and segments A to E of the I signal.

FIG. 5 is a diagram illustrating a waveform and section A to E of the IQ signal. In FIG. 5, the horizontal axis represents time and the vertical axis represents the phase of the IQ signal. The phase of the IQ signal illustrated in FIG. 5 indicates a value in which the main controller 161 converts the I/Q signals taken from the memory 141 of the FSK 140 (refer to FIG. 3) by the controller 160 (refer to FIG. 3) into a phase.

A circle mark on the waveform of FIG. 5 represents the timing (sampling point) at which the controller 160 samples the I/Q signals. The sampling period is, for example, 1 μs. The receiver 100 shortens the sampling period so that the phase of the I/Q signals can be acquired at multiple points in each interval.

Further, since the time at which the reception of the advertisement packet from which the I/Q signals are based is started and the time at which the reception is completed is known, all of the times at which the I/Q signals are sampled is known, and the time data is stored in the memory 165 associated with each sampling point.

The section A is a section in which the phase before the rising phase is approximately zero. The section B is a rising section. The section C is a section in which the phase has a substantially maximum value, and is a section between the rising section B and the falling section D. The section D is a falling section. The section E is a section in which the phase after the falling section is substantially zero. The section A and the section E are also sections between the rising section B and the falling section D.

The Direction-of-Arrival estimation unit 164 of the controller 160 calculates the phase difference of the phase of the I/Q signals of the section C with respect to the phase of substantially zero in the section A to estimate the Angle-of-Arrival of the advertisement packet. Therefore, the receiver 100 accurately determines the amplitude difference of the I/Q signals by determining the section (A to E) of such I/Q signals and determining the position of the section C in the time axis direction. This is because if the position of the section C is known, the phase difference of the I/Q signals of the section C with respect to the phase of substantially zero in the section A can be calculated.

A start point Bs in the section B is the earliest (oldest) sampling point among the sampling points in the section B. An end point De of the section D is the latest (new) sampling point among the sampling points included in the section D. A start point Cs represents the start point of the section set in Step S6, which will be described later, and an end point Ce represents the end point of the section set in Step S6, which will be described later. The phase of the sampling point between the start point Cs and the end point Ce is used for positioning by the AOA. Further, the start point Cs and the end point Ce are moved in the time axis direction by the process of step S6. The start point Cs and the end point Ce illustrated in FIG. 5 are illustrated as an image.

Figure 6:
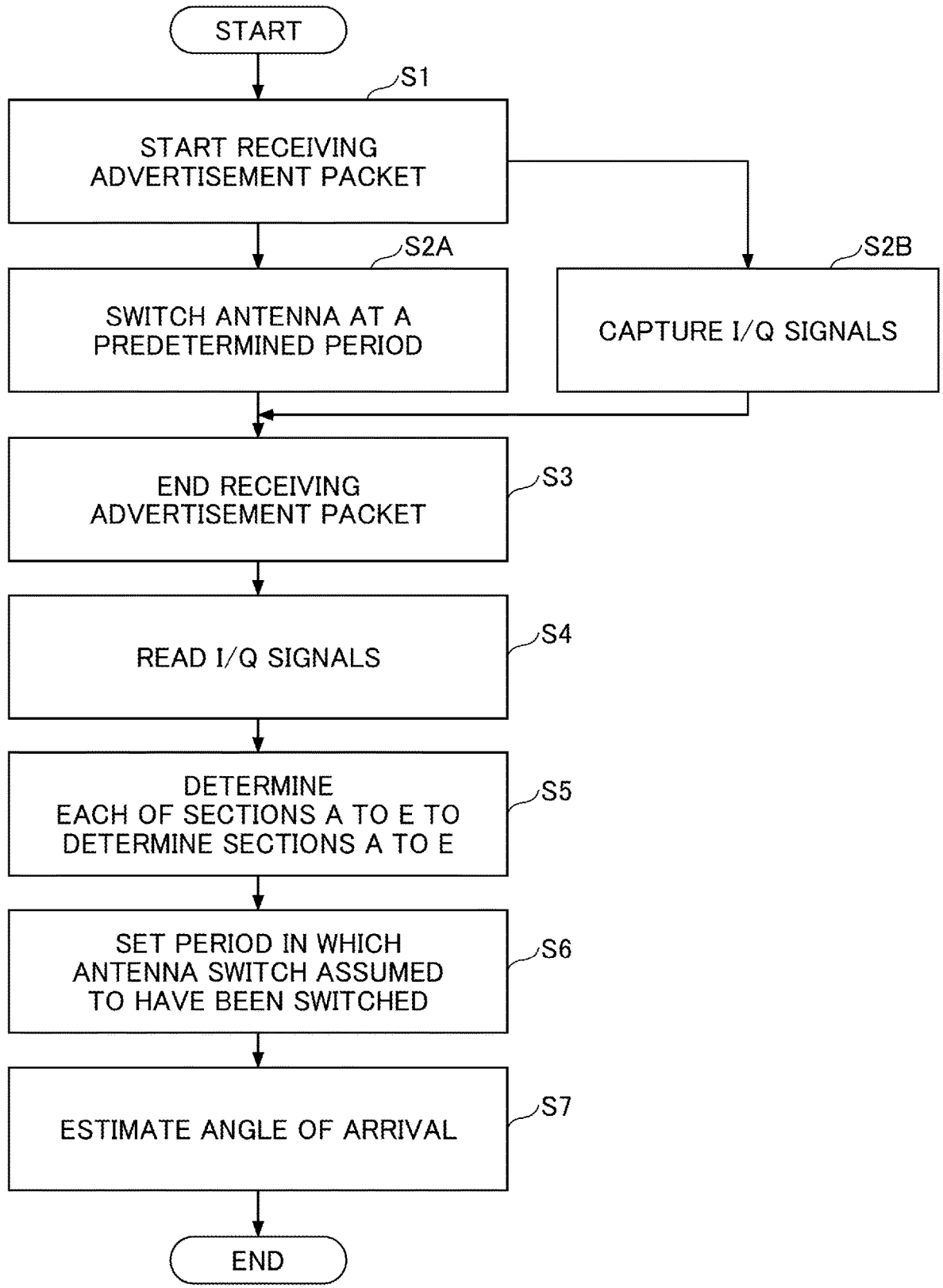
FIG. 6 is a flowchart illustrating a process performed by a controller 160.

FIG. 6 is a flowchart illustrating a process performed by the controller 160.

When the process starts, the main controller 161 starts receiving the advertisement packet (step S1). Specifically, the main controller 161 functions as the timing controller 106 and the antenna controller 107 illustrated in FIG. 2. Further, the main controller 161 acquires the time data representing the time when the advertisement packet started to be received and stores the acquired time data in the memory 165.

The main controller 161 switches the three antennas 101 at a predetermined period by the antenna switch 102 (step S2A).

The main controller 161 performs the process of step S2A and performs a process of capturing the I/Q signals from the memory 141 to the memory 165 (step S2B).

The main controller 161 ends receiving the advertisement packet (step S3). The main controller 161 acquires the time data representing the time when the reception of the advertisement packet is completed and stores the acquired time data in the memory 165.

The section detector 162 reads the I/Q signals from the memory 165 (step S4).

The section detector 162 determines each of the sections A to E based on the read I/Q signals and determines the sections A to E (step S5). Details of step S5 will be described later with reference to FIG. 7.

The section setting unit 163 sets a period in which it is assumed that the antenna switch 102 was being switched based on the determined section (step S6). Details of step S6 will be described later with reference to FIG. 8.

The Direction-of-Arrival estimation unit 164 acquires the average value of the phase of the I/Q signals at all sampling points included in the period of switching the antenna switch 102 set in step S6, calculates the phase difference of the I/Q signals from the average value of the phase acquired from the advertisement packet received by the three antennas 101 (refer to FIG. 2), and estimates the Angle-of-Arrival of the advertisement packet (step S7).

The series of processes is completed.

Figure 7:
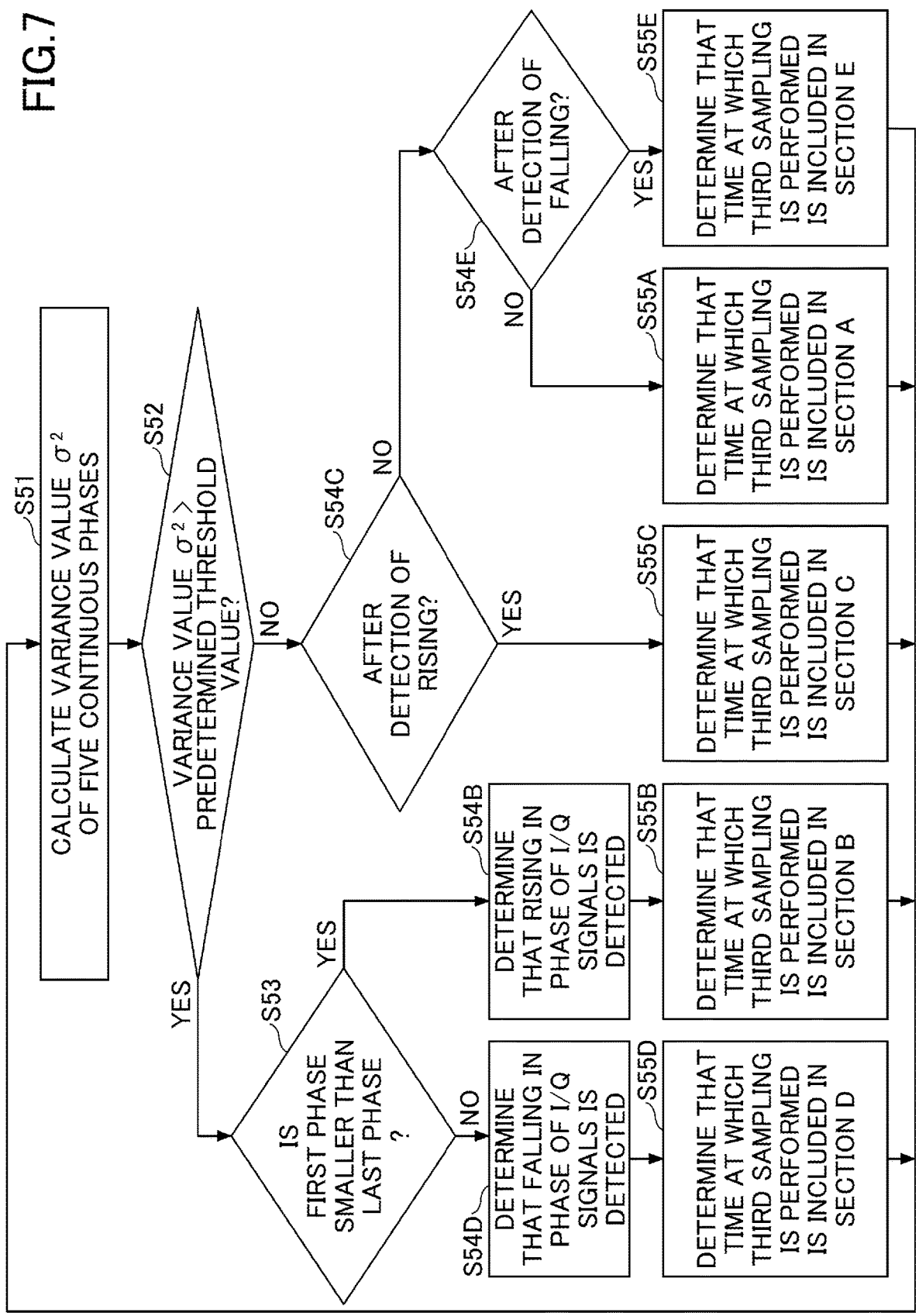
FIG. 7 is a flowchart illustrating a detailed process of step S5 of FIG. 6.

FIG. 7 is a flowchart illustrating a detailed process of step S5 of FIG. 6.

The section detector 162 samples the phase from the top of the I/Q signals, selects five continuous phases from the top, and calculates the variance value $\sigma^2$ of the five continuous phases (step S51).

As illustrated in FIG. 5, the five continuous phases are five phases acquired in five continuous sampling periods as a first phase in the time axis of any one of the phases acquired in a predetermined sampling period. Of the five phases, the time when the first (left side) phase of the time axis direction is acquired is the oldest, and the time when the last (right side) phase of the time axis direction is acquired is the newest.

In the process of step S51, every time the flow illustrated in FIG. 7 is repeated, the five continuous phases are selected by shifting the sampling point one by one from the top of the I/Q signals (to the new direction in the time axis direction) backward, and the variance value $\sigma^2$ of the five continuous phases is calculated. In the case of the I signal illustrated in FIG. 5, five sampling points are selected from the top, and the variance value $\sigma^2$ of the five selected phases is calculated by shifting the selected sampling points one by one backward each time the process is repeated in step S51.

Here, the method of calculating the variance value $\sigma^2$ by using five phases will be described. However, the number of phases used for calculating the variance value $\sigma^2$ may be any number as long as it is plural. For example, the frequency of the I/Q signals may be set to an appropriate value in relation to the sampling period.

Assuming that the phases are Ai, the variance value of the five phases Ai is calculated according to the following Formula (1). i is an integer representing the i-th sampling order.

[Math 1]

$$\sigma^2 = \frac{1}{5}\left(\sum_{i=1}^{5}(Ai^2 - Aave^2)\right) \quad (1)$$

Instead of the variance value $\sigma^2$, an average value of five continuous phases, a minimum square value, or the like may be used.

The section detector 162 determines whether the variance value $\sigma^2$ is greater than a predetermined threshold value (step S52).

When it is determined that the variance value is greater than the predetermined threshold value (S52: YES), the section detector 162 determines whether the first phase of the five phases is smaller than the last phase (step S53).

When it is determined that the first phase is not smaller than the last phase (S53: NO), the section detector 162 determines that a falling in the phase of the I/Q signals is detected (step S54D).

Then, the section detector 162 determines that the time when the third phase is acquired from the top of the five phases is included in the section D. That is, the section detector 162 determines that the time at which the i+2 sampling was performed is included in the section D. When the process of step S55D is completed, the section detector 162 returns the flow to step S51.

When it is determined in step S53 that the first phase is smaller than the last phase (S53: YES), the section detector 162 determines that a rising of the phase of the I/Q signals is detected (step S54B).

Subsequently, the section detector 162 determines that the time when the third phase is acquired from the top of the five phases is included in the section B (step S55B). That is, the section detector 162 determines that the time at which the i+2 sampling was performed is included in the section B. When the process of step S55B is completed, the section detector 162 returns the flow to step S51.

When it is determined in Step S52 that the variance value is not greater than the predetermined threshold value (S52: NO), after starting the process of step S51 and before all of the sections A to E are determined, the section detector 162 determines whether the rising is detected (step S54C). When it is determined in step S52 that the variance value is not greater than the predetermined threshold value (S52: NO), the waveform is a flat section such as the section A or C. Thus, whether it is the section A or C is determined depending on before and after the detection of the rising.

When it is determined that the rising is detected (S54C: YES), the section detector 162 determines that the section C includes the time when the third phase is acquired from the top of the five phases. When the process of step S55C is completed, the section detector 162 returns the flow to step S51.

If the section detector 162 determines in step S54C that it is not after the rising is detected (S54C: YES), the section detector 162 determines whether it is after the falling is detected (step S54E).

If the section detector 162 determines that it is after the falling is detected (S54E: YES), the section detector 162 determines that the time when the third phase from the top of the five phases is acquired is included in the section E (step S55E).

If the section detector 162 determines in step S54E that it is not after the falling is detected (S54E: YES), the section detector determines that the time when the third phase is acquired from the top of the five phases is included in the section A (step S55A).

As described above, each time the flow illustrated in FIG. 7 is repeated, the five phases used in the calculation of the variance value $\sigma^2$ in step S51 are shifted one by one in the time axis direction to determine the sections A to E. In the I signal illustrated in FIG. 5, the variance value $\sigma^2$ is calculated repeatedly until the last sampling point of the rightmost sections E is included, while selecting five phases from the left, and the sections A to E are determined.

As described above, the section detector 162 detects the section between the rising and falling of the I/Q signals based on the rising or falling of the phase of the I/Q signals generated based on the advertisement packet transmitted from the smartphone 200. The sections between risings and fallings are the section A, the section C, and the section E.

Further, the section C, the section A, and the section E are determined depending on whether the section between the rising and the falling is detected after the rising or the falling.

Figure 8:
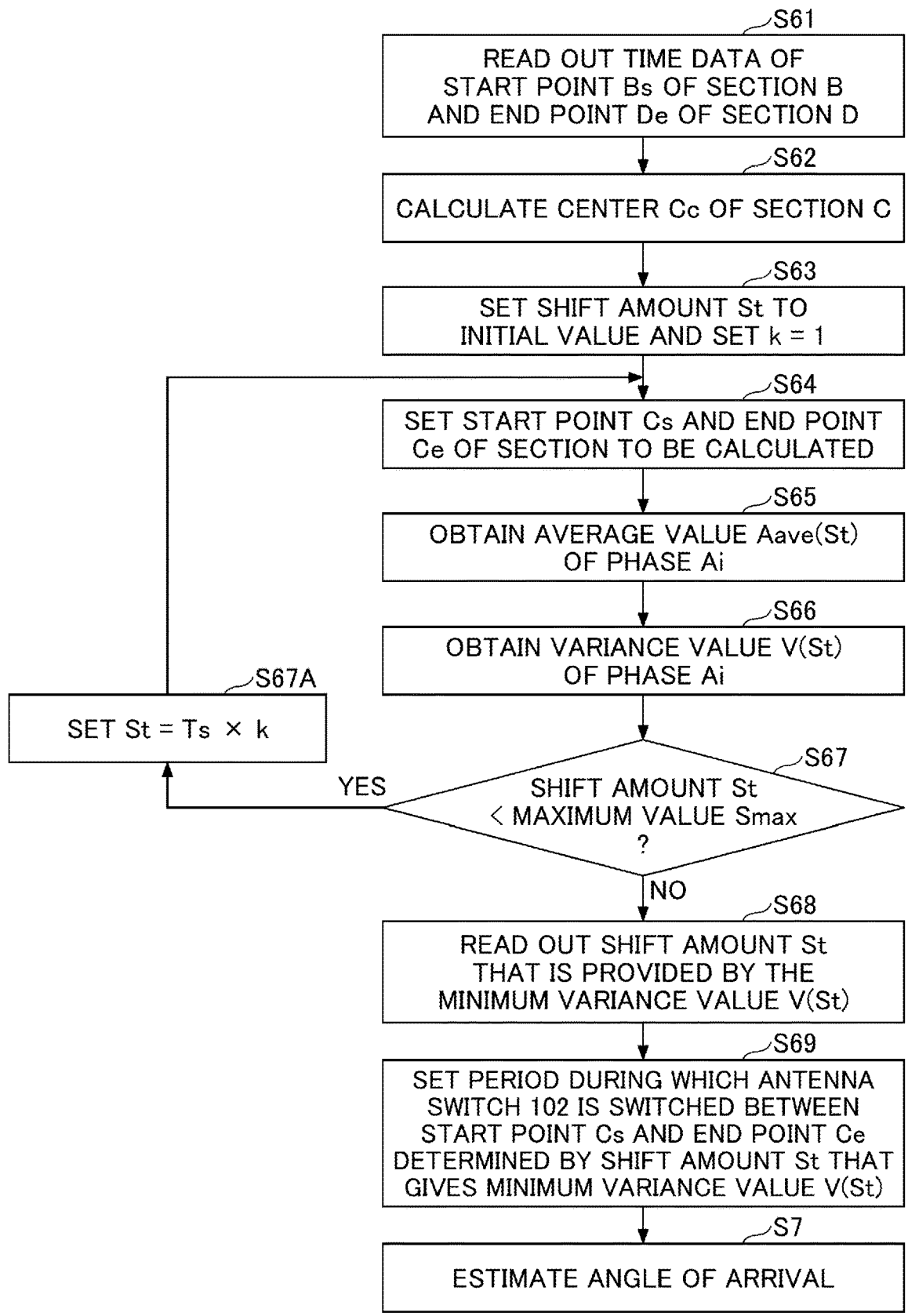
FIG. 8 is a flowchart illustrating a detailed process of step S6 of FIG. 6.

FIG. 8 is a flowchart illustrating a detailed process of step S6 and step S7 of FIG. 6.

The section setting unit 163 reads out the time data of the start point Bs of the section B and the end point De of the section D from the memory 165 (step S61).

The section setting unit 163 calculates a center Cc in the time axis direction of the section C by the following Formula (2) using the start point Bs of the section B and the end point De of the section D (step S62). The center Cc is determined as the center time between the time represented by the time data of the start point Bs and the time represented by the time data of the end point De of the section D.

$$Cc=(Bs+De)/2 \qquad (2)$$

Here, the center Cc may be calculated as the center of the time represented by the time data of the start point Bs and the time represented by the time data of the end point De of the section D. However, the center Cc may be calculated as the center in the direction of the time axis of the end point of the section B and the start point of the section D.

The section setting unit 163 sets a shift amount St, which shifts the start point Cs in the negative direction (the direction toward old side) of the time axis and the end point Ce in the positive direction (the direction toward new side) of the time axis, to the initial value and sets k=1 (step S63). k is the number incremented in step S67A described later each time the flow illustrated in FIG. 8 is repeated.

The initial value of the shift amount St is the time (Ts) corresponding to one period of the sampling period Ts. The start point Cs and the end point Ce are the starting point and the end point of the section to be calculated. The section to be calculated is the section in which the average value of the phase of the I/Q signals is obtained in step S65.

The section setting unit 163 sets the start point Cs and the end point Ce of the section to be calculated by the following Formula (3) (step S64).

$$Cs=Cc-St$$

$$Ce=Cc+St \qquad (3)$$

The section setting unit 163 obtains an average value Aave(St) of the phase Ai at all the sampling points included in the section to be calculated according to the following Formula (4) (step S65). A(Cs) is the phase at the start point Cs, and A(Ce) is the phase at the end point Ce. The phase at all sampling points in the section to be calculated from the start point Cs to the end point Ce is denoted by the phase Ai as a general notation.

$$A\text{ave}(St)=(A(Cs)A(Ce))/(2St+1) \qquad (4)$$

The section setting unit 163 obtains a variance value V(St) of the phase Ai at all the sampling points included in the section to be calculated according to the following Formula (5) (step S66).

$$V(St)=(\Sigma(Ai-A\text{ave})^2)/(2St+1) \qquad (5)$$

The section setting unit 163 determines whether the shift amount St is smaller than a predetermined maximum value Smax (step S67).

When it is determined that the shift amount St is smaller than the predetermined maximum value Smax (S67: YES), the section setting unit 163 sets k=k+1 and sets the shift amount St=Ts×k (Step S67A). This increases the shift amount St by one period of the sampling cycle Ts.

When the process of step S67A is completed, the section setting unit 163 returns the flow to step S64. This is to change the start point Cs and the end point Ce of the section to be calculated and further expand the section to be calculated to repeat the processing of steps S64 to S67. More specifically, the start point Cs moves to the previous sampling point in the time axis direction and the end point Ce moves to the next sampling point in the time axis direction.

When it is determined in Step S67 that the shift amount St is not smaller than the predetermined maximum value Smax (S67: NO), the section setting unit 163 reads out the shift amount St that is provided by the minimum variance value V(St) among the variance values V(St) obtained in step S66 (step S68).

The average value, the least-squares value, or the like may be used instead of the variance value V(St). In addition to the minimum variance value V(St), the shift amount St that gives the variance value V(St) equal to or less than the predetermined value from among all the variance values V(St) may be read from the memory 165.

The section setting unit 163 sets a period during which the antenna switch 102 is switched between the start point Cs and the end point Ce determined by the shift amount St that gives the minimum variance value V(St) read in step S68 (step S69).

The Direction-of-Arrival estimation unit 164 acquires the average value of the phase of the I/Q signals at all sampling points included in the period of switching the antenna switch 102 set in step S6, calculates the phase difference of the I/Q signals from the average value of the phase acquired from the advertisement packet received by the three antennas 101 (refer to FIG. 2), and estimates the Angle-of-Arrival of the advertisement packet (step S7).

As described above, according to Embodiment 1, the sections A to E can be determined, and the section in which the variance value is minimized can be obtained from the section C. Therefore, the phase difference of the I/Q signals can be accurately determined within the section.

Accordingly, according to Embodiment 1, the receiver 100 capable of accurately determining the phase difference of the I/Q signals can be provided.

Figure 9:
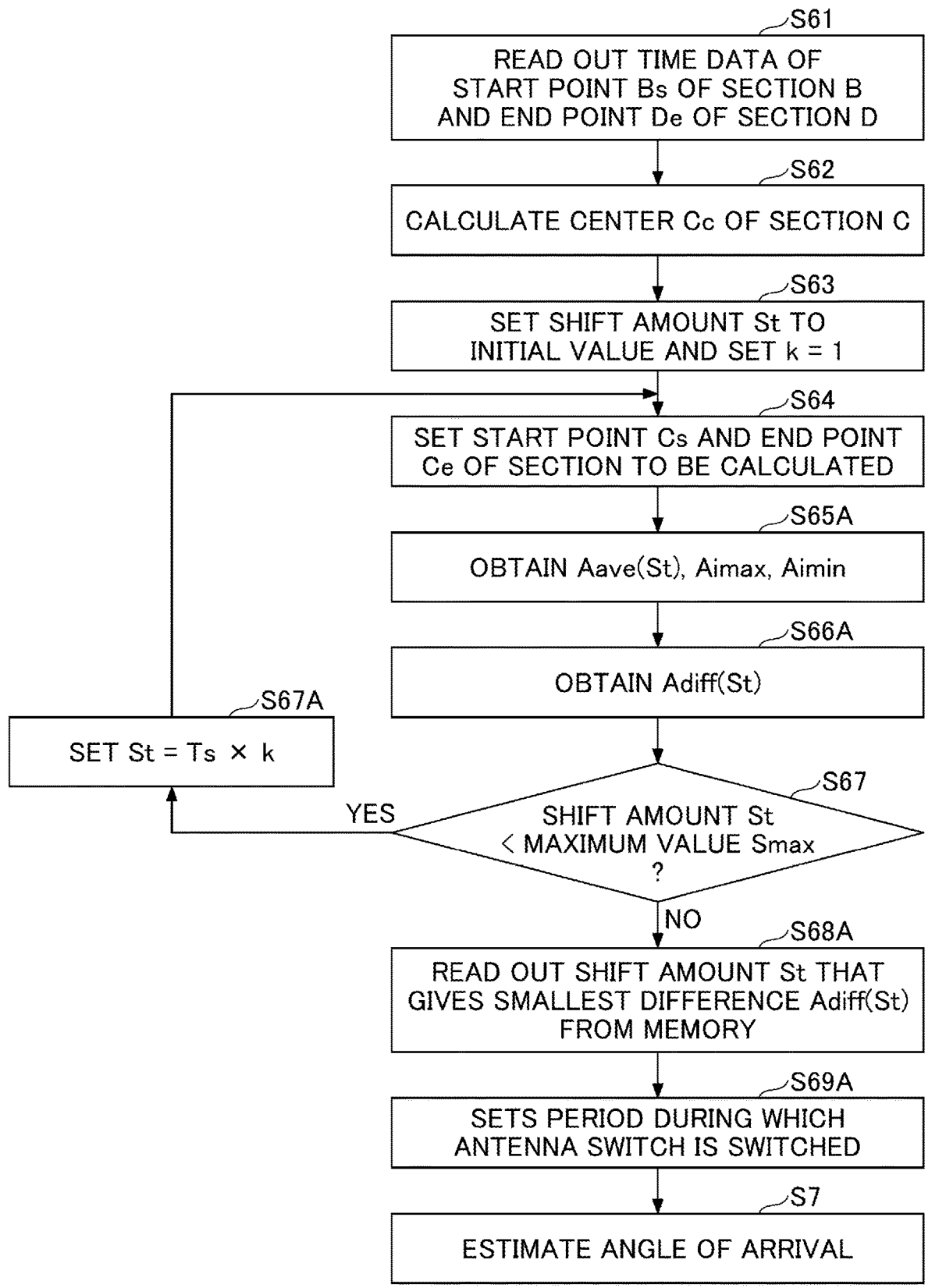
FIG. 9 is a flowchart illustrating a process according to a modification of Embodiment 1.

FIG. 9 is a flowchart illustrating processing according to a modification of Embodiment 1. FIG. 9 illustrates a variation of the process illustrated in FIG. 8. More specifically, steps S65, S66, S68, and S69 in the process of FIG. 8 are replaced with steps S65A, S66A, S68A, and S69A, respectively. Therefore, steps S65A, S66A, S68A, and S69A will be described herein.

When the process in step S64 is completed, the section setting unit 163 calculates the average value Aave(St) of the phase Ai at all sampling points included in the section to be calculated, the maximum value Aimax of the phase Ai at all sampling points included in the section to be calculated, and the minimum value Aimin of the phase Ai at all sampling points included in the section to be calculated according to the following Formulas (4A), (5A), and (6A) (Step S65A). A(Cs) is the phase at the start point Cs, and A(Ce) is the phase at the end point Ce.

$$A\text{ave}(St)=(A(Cs)A(Ce))/(2St+1) \quad (4A)$$

$$A\text{imax}(St)=\text{MAX}(A(Cs)A(Ce)) \quad (5A)$$

$$A\text{imin}(St)=\text{MIN}(A(Cs)A(Ce)) \quad (6A)$$

Here, MAX(A(Cs)~A(Ce)) and MIN(A(Cs)~A(Ce)) are equations for obtaining the maximum value and the minimum value between A(Cs) and A(Ce), respectively.

The section setting unit 163 determines the difference Adiff(St) between the maximum value Aimax(St) and the minimum value Aimin(St) at all sampling points included in the section to be calculated according to the following Formula (7) (step S66A).

$$A\text{diff}(St)=A\text{imax}(St)-A\text{imin}(St) \quad (7)$$

Subsequently, in Step S67, the section setting unit 163 determines whether the shift amount St is smaller than the predetermined maximum value Smax. When it is determined that the shift amount St is not smaller than the predetermined maximum value Smax (S67: NO), the section setting unit 163 reads out the shift amount that gives the smallest difference Adiff(St) of the difference Adiff(St) obtained in the previous steps S66A from the memory 165 (step S68A).

Subsequently, the section setting unit 163 sets a period during which the antenna switch 102 is switched between the section determined by the start point Cs and the end point Ce determined by the shift amount St read in step S68A (step S69A).

As described above, the difference Adiff(St) between the maximum value Aimax and the minimum value Aimin at all the sampling points included in the section to be calculated may be obtained, and the average value Aave(St) corresponding to the shift amount St giving the difference of the minimum value Adiff(St) may be output.

Accordingly, according to the modification of Embodiment 1, a receiver capable of accurately determining the phase difference of the I/Q signals can be provided.

Embodiment 2

Figure 10:
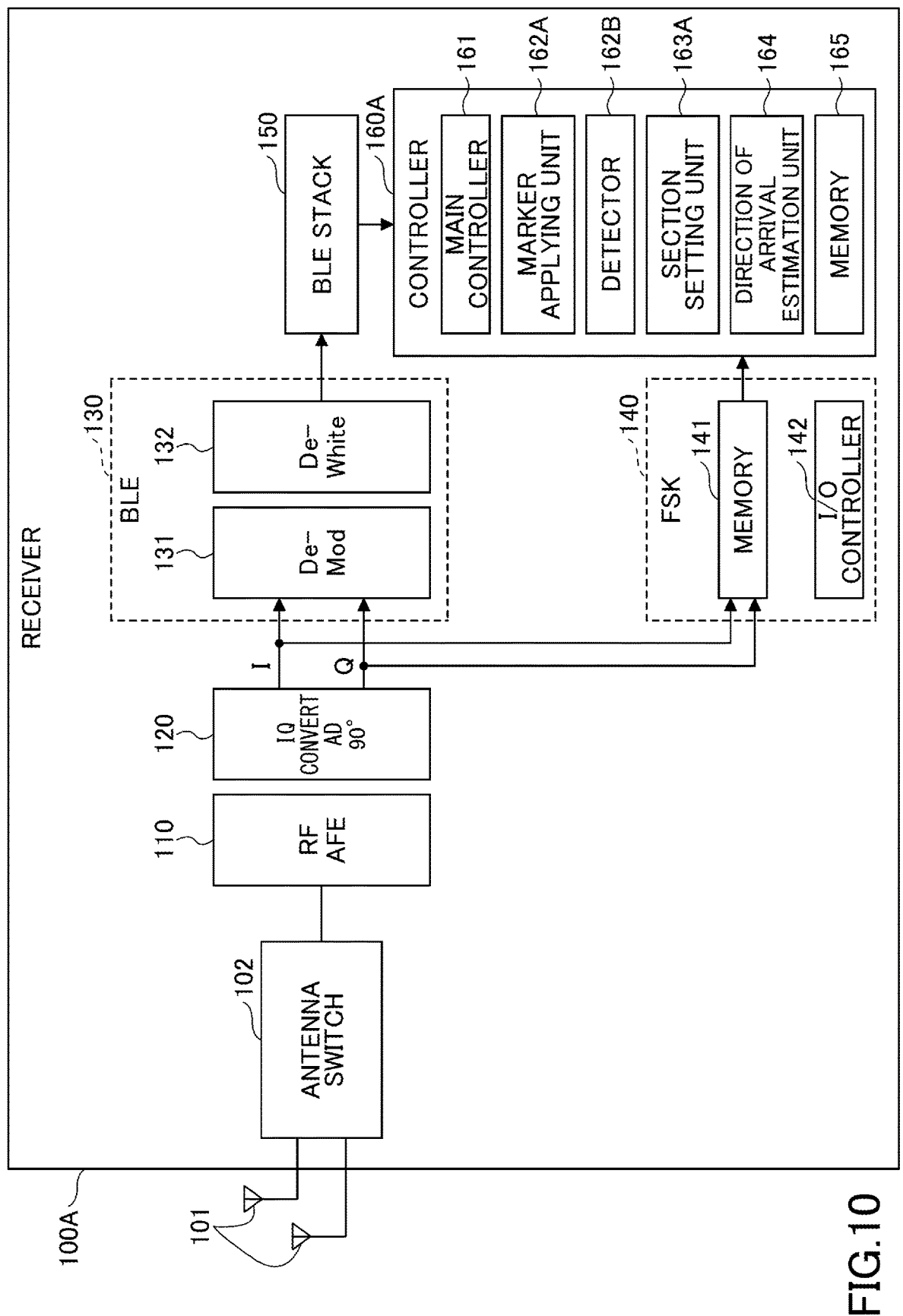
FIG. 10 is a diagram illustrating a receiver 100A according to Embodiment 2.

FIG. 10 is a diagram illustrating a receiver 100A according to Embodiment 2. Hereinafter, the same components as those in Embodiment 1 are denoted by the same reference numerals, and the description thereof will be omitted.

The receiver 100A includes an RFAFE 110, an AD converter 120, a BLE circuit 130, an FSK processing unit 140, a BLE stack 150, and a controller 160A.

The controller 160A includes a main controller 161, a marker applying unit 162A, a detector 162B, a section setting unit 163A, a Direction-of-Arrival estimation unit 164, and a memory 165.

The marker applying unit 162A applies a marker to I/Q signals generated based on an advertisement packet transmitted from the smartphone 200. The marker is a marker waveform given to the I/Q signals, and typically has a pulse-shaped waveform that changes in a short period of time so as not to be included in the I/Q signals. The marker may be any marker as long as it causes a change in waveform that is not included in the I/Q signals. The addition of the marker is performed, for example, by changing the characteristics of the filter in the RFAFE 110. The marker is applied when the antenna 101 is switched.

The detector 162B detects the marker and a section between the rising and the falling of the phase of the I/Q signals.

The section setting unit 163A adjusts the section for detecting the phase difference of the I/Q signals in the phase direction such that the section for detecting the phase difference of the I/Q signals is included in the section for detecting the phase difference between the rising and the falling of the I/Q signals based on the detection result of the detector 162B.

The Direction-of-Arrival estimation unit 164 acquires the amplitude of the section between the rising and falling of the I/Q signals and estimates the Direction-of-Arrival of the advertisement packet from the phase difference of the I/Q signals received by the three antennas 101.

Figure 11:
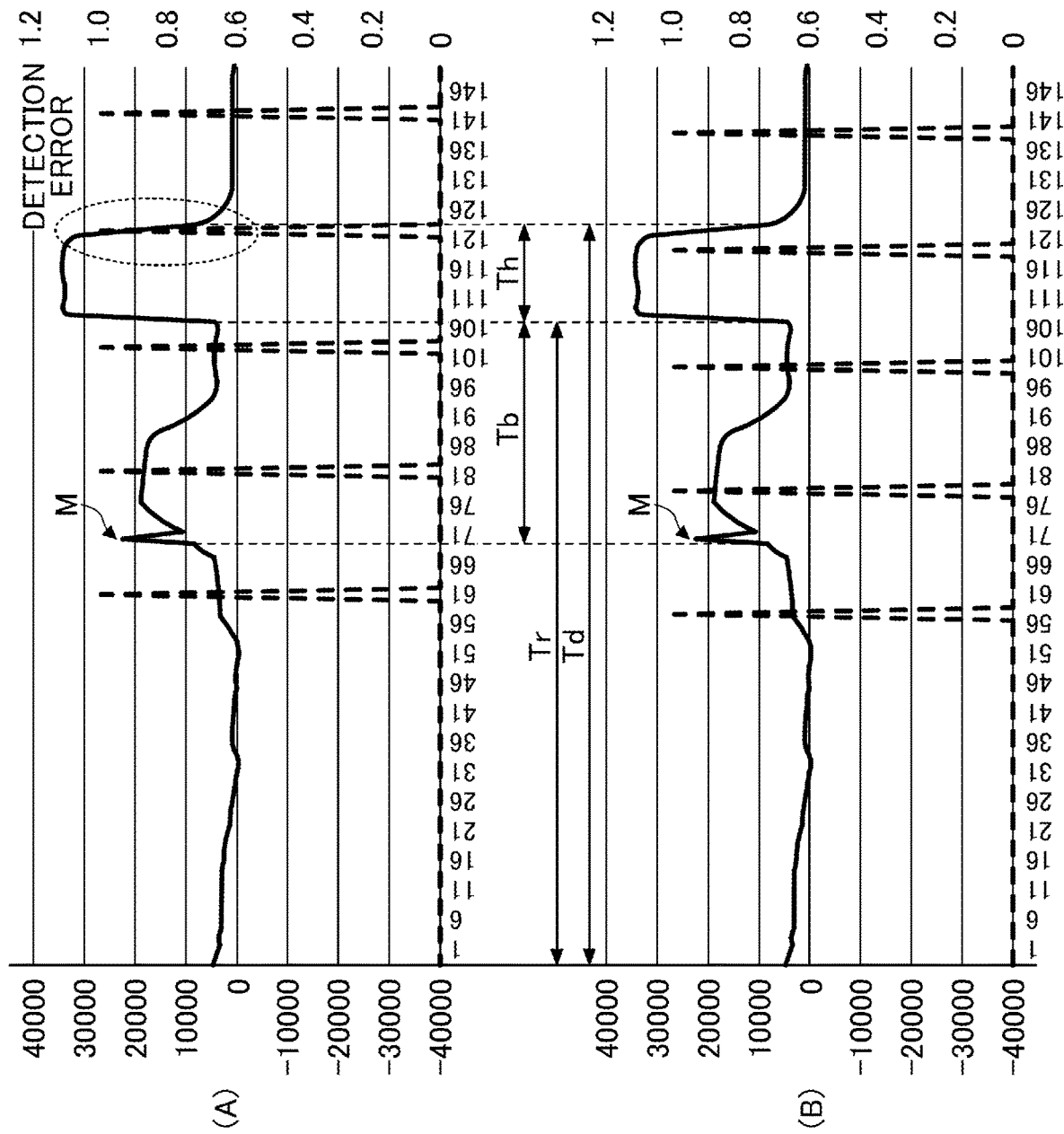
FIG. 11 is a diagram illustrating an adjustment of a phase direction of an interval for detecting a phase difference of I/Q signals.

FIG. 11 is a diagram illustrating a method of detecting a phase difference of the I/Q signals. In FIG. 11, the horizontal axis represents the time (the elapsed time since the receiver 100A started receiving the I/Q signals) and the vertical axis represents the phase of the I/Q signals.

Here, the I signal of the I/Q signals is illustrated by a solid line, but since the I signal and the Q signal are similar signals having a phase difference of 90 degrees and have a blunt rectangular wavy waveform, the I/Q signals will be described below as processing for the I/Q signals. Further, in FIG. 11, the dashed line waveform represents the timing of the sampling. Five pulses of the dashed waveform represent the timing of the sampling. The end of the sampling period is, for example, 20 μs.

In order to detect the phase difference of the I/Q signals, the marker M is applied to the I/Q signals as illustrated in (A) of FIG. 11. The marker applying unit 162A applies the marker M. When the marker M is applied to the I/Q signals at the timing of substantially 71 μs, the I/Q signals are affected by the phase fluctuation up to substantially 91 μs.

The detector 162B detects the marker M, and rises and falls of the phase of the I/Q signals, and detects the time Tr and the time Td, from the start of reception of the I/Q signals by receiver 100A, until the rising and falling of the phase of the I/Q signals, respectively, and the time Tb between the marker M and the rising.

In (A) of FIG. 11, the timing of the I/Q signals and the sampling period before adjusting the phase are illustrated. Therefore, the marker M is between a first sampling and a second sampling, the phase of the I/Q signals rises after a third sampling, and the phase of the I/Q signals falls immediately before a fourth sampling. Accordingly, in the fourth sampling, the phase of the section between the rising and the falling of the phase of the I/Q signals cannot be measured.

In this case, the detector 162B detects the time Tr and the time Td, from the start of reception of the I/Q signals by the receiver 100A respectively to the rising and fall of the I/Q signals, and the time Tb between the marker M and the rising.

The section setting unit 163A adjusts the phase of the I/Q signals such that the fourth sampling timing is included in a section Th between the rising and falling of the phase of the I/Q signals, based on the times Tr and Td until the rising and falling, of the phase of the I/Q signals, respectively, and on the time Tb.

The I/Q signals after adjusting the phase is illustrated in (B) of FIG. 11. In (B) of FIG. 11, the marker M exists between the first sampling and the second sampling, the phase of the I/Q signals rises after the third sampling, and the fourth sampling takes place in the section Th between the rising and falling of the I/Q signals. Therefore, the phase of the I/Q signals can be measured.

The section setting unit 163A adjusts the phase of the I/Q signals such that the sampling timing is included in the section Th between the rising and falling of the phase of the I/Q signals, based on the times Tr and Td until the rising and falling of the phase of the I/Q signals, respectively, and on the time Tb. In (B) of FIG. 11, the sampling timing is substantially 5 μs earlier than in (A) of FIG. 11.

The Direction-of-Arrival estimation unit 164 acquires the phase of the section Th between the rising and falling of the I/Q signals and estimates the Direction-of-Arrival of the advertisement packet based on the phase difference of the I/Q signals received by the three antennas 101.

Figure 12:
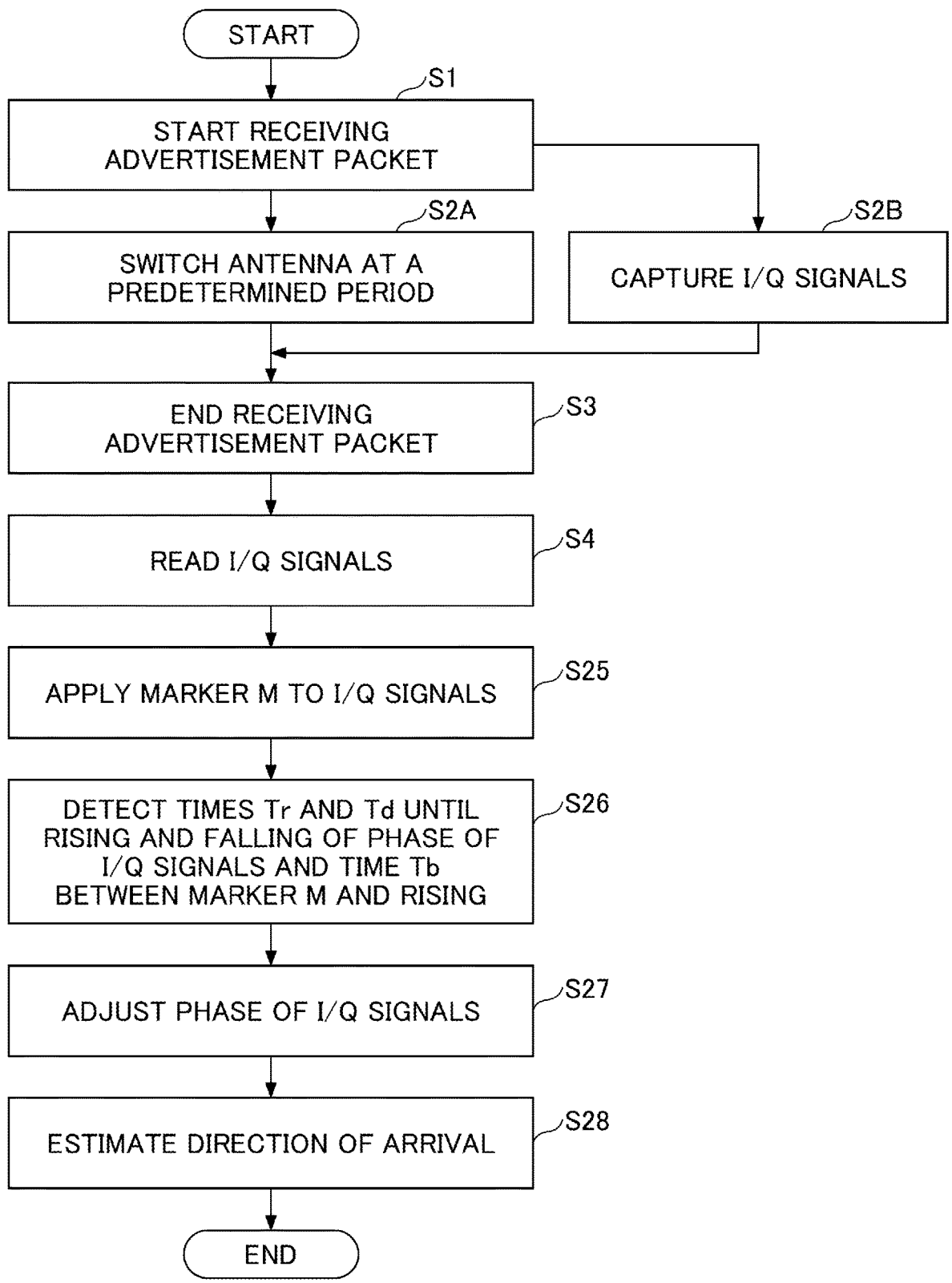
FIG. 12 is a flowchart illustrating a process performed by a controller 160A.

FIG. 12 is a flowchart illustrating a process performed by the controller 160A. Among the processes illustrated in FIG. 12, steps S1 to S5 are identical to steps S1 to S4 illustrated in FIG. 6. Therefore, the process of Step S4 and the subsequent steps will be described.

The section detector 162 reads the I/Q signals from the memory 165 (step S4).

The marker applying unit 162A applies the marker M to the I/Q signals (step S25). In this state, the sampling timing is not adjusted, so the timing of the I/Q signals and the sampling may be misaligned as illustrated in (A) of FIG. 11.

The detector 162B detects the rising and falling of the marker M included in the I/Q signals and the rising and falling of the phase of the I/Q signals, and detects the times Tr and Td until the rising and falling of the phase of the I/Q signals and the time Tb between the marker M and the rising (step S26).

The section setting unit 163A adjusts the phase of the I/Q signals such that the fourth sampling for detecting the phase difference of the I/Q signals is performed within the section Th between the rising and falling based on the time Tr and Td until the rising and falling of the phase of the I/Q signals, respectively, which are detected by the detector 162B, and on the time Tb (step S27).

The Direction-of-Arrival estimation unit 164 acquires the phase of the section between the rising and falling of the I/Q signals and estimates the Direction-of-Arrival of the advertisement packet from the phase difference of the I/Q signals received by the three antennas 101.

As described above, according to Embodiment 2, the phase of the I/Q signals is adjusted such that sampling for detecting the phase difference of the I/Q signals using the marker M is performed within the section between the rising and falling. Therefore, the phase difference of the I/Q signals received by the three antennas 101 can be accurately determined within the section between the rising and falling of the phase of the I/Q signals.

Accordingly, according to Embodiment 2, the receiver 100A capable of accurately determining the phase difference of the I/Q signals can be provided.

Although the receiver according to Embodiments of the present invention has been described, the present invention is not limited to the specifically disclosed embodiments, and various changes and modifications can be made without departing from the scope of the claims.

What is claimed is:

1. A receiver comprising:
   a section detector configured to detect a section between a rising and a falling of a phase based on the rising and the falling of the phase represented by I/Q signals generated based on an advertisement packet transmitted from a transmitter; and
   a section setting unit configured to identify, within the section between the rising and the falling of the phase, a period in which a first variation amount of the phase is equal to or less than a first predetermined amount, and use the identified period as a section for detecting the phase of the I/Q signals,
   wherein the section detector detects the rising when a first phase is smaller than a last phase among a plurality of phases acquired by sampling the phases.

2. The receiver according to claim 1, wherein the section detector detects a section after the rising or a section before the falling as the section between the rising and the falling.

3. The receiver according to claim 2, wherein the section detector detects the section between the rising and the falling located after the rising when a second variation of a plurality of phases acquired from phases at sampling points shifted later in a time axis direction is equal to or less than a second predetermined amount and is after the rising is detected.

4. The receiver according to claim 1, wherein the section detector detects the falling when the first phase among the plurality of phases acquired by sampling the phases is greater than the last phase.

5. The receiver according to claim 4, wherein the section detector detects the section between the rising and the falling located after the falling, when a second variation of the plurality of phases acquired from the phases at sampling points shifted later in a time axis direction is equal to or less than a second predetermined amount and is after the falling is detected.

6. The receiver according to claim 4, wherein the section detector detects the section between the rising and the falling located after the falling when a second variation of the plurality of phases acquired from the phase at a sampling point shifted backward in a time axis direction is equal to or less than a second predetermined amount and is not after the falling is detected.

7. The receiver according to claim 3, wherein the second variation amount is a variance value of the plurality of phases or a difference between a maximum value and a minimum value of the plurality of phases.

8. The receiver according to claim 1, wherein the section setting unit, before and after from a center between a start point of the rising and an end point of the falling in a time axis direction, identifies a period in which the first variation amount of the I/Q signals is equal to or less than a predetermined amount, and uses the identified period as the section for detecting the phase, or, before and after from a center between an end point of the rising and a start point of the falling in the time axis direction, identifies a period in which the first variation amount of the I/Q signals is equal to or less than a predetermined amount, and uses the identified period as the section for detecting the phase.

9. The receiver according to claim 8, wherein the first variation amount is a variance value of the phase before and after from the center between the start point of the rising and the end point of the falling in the time axis direction, or a difference between a maximum value and a minimum value of the I/Q signals before and after from the center between the start point of the rising and the end point of the falling in the time axis direction.

10. The receiver according to claim 9, wherein the rising and the falling are generated by switching a plurality of antennas for receiving the advertisement packet, and a Direction-of-Arrival of a radio wave is measured based on the phase difference of the I/Q signals.

11. The receiver according to claim 8, wherein the section in which the first variation amount of the I/Q signals is equal to or less than the predetermined amount is a section in which the variation value of the phase is a minimum or a section in which the variation value of the phase is equal to or less than a predetermined value.

12. A receiver comprising:
a marker applying unit configured to apply a marker to I/Q signals generated based on an advertisement packet transmitted from a transmitter;
a detector configured to detect the marker and a section between a rising and a falling of the I/Q signals; and
a section setting unit configured to adjust a section for detecting a phase in a phase direction such that the section for detecting the phase represented by the I/Q signals is included in the section between the rising and the falling based on a detection result of the detector.

13. The receiver according to claim 12, wherein the rising and the falling are generated by switching a plurality of antennas for receiving the advertisement packet, and a Direction-of-Arrival of a radio wave is measured based on the phase difference of the I/Q signals.

14. The receiver according to claim 13, wherein the marker applying unit assigns the marker when switching the plurality of antennas.

15. The receiver according to claim 12, further comprising a section detector configured to detect a section between a rising and a falling of a phase based on the rising and the falling of the phase represented by I/Q signals generated based on an advertisement packet transmitted from a transmitter,
wherein the section detector detects the section between the rising and the falling located after the rising when a second variation of the plurality of phases acquired from phases at sampling points shifted later in a time axis direction is equal to or less than a second predetermined amount and is after the rising is detected.

16. The receiver according to claim 15, wherein the section detector detects the falling when the first phase of the plurality of phases acquired by sampling the phases is greater than the last phase.

17. The receiver according to claim 16, wherein the section detector detects the section between the rising and the falling located after the falling when a second variation of the plurality of phases acquired from phases at sampling points shifted later in a time axis direction is equal to or less than a second predetermined amount and is after the falling is detected.

18. The receiver according to claim 16, wherein the section detector detects the section between the rising and the falling located after the falling when a second variation of the plurality of phases acquired from the phases at sampling points shifted later in a time axis direction is equal to or less than a second predetermined amount and is not after the falling is detected.

19. The receiver according to claim 15, wherein the second variation amount is a variance value of the plurality of phases or a difference between a maximum value and a minimum value of the plurality of phases.

* * * * *